H. SIEBERT.
SHEAF CUTTING MACHINE.
APPLICATION FILED MAR. 2, 1920.

1,382,562. Patented June 21, 1921.

Inventor
Henry Siebert
By Geo. P. Kimmel
Attorney

UNITED STATES PATENT OFFICE.

HENRY SIEBERT, OF ULM, ARKANSAS.

SHEAF-CUTTING MACHINE.

1,382,562. Specification of Letters Patent. Patented June 21, 1921.

Application filed March 2, 1920. Serial No. 362,779.

*To all whom it may concern:*

Be it known that I, HENRY SIEBERT, a citizen of the United States, residing at Ulm, in the county of Prairie and State of Arkansas, have invented certain new and useful Improvements in Sheaf-Cutting Machines, of which the following is a specification.

The invention relates to a cutting machine, and more particularly to the class of sheaf cutters.

The primary object of the invention is the provision of a machine of this character, wherein the bundles or sheaves of grain, rice or the like material can be cut for removing the butts, stubble or the bottom ends, without necessity of removing the material from the bundles, and these removed ends will be discharged from the machine during the cutting operation.

Another object of the invention is the provision of a machine of this character, wherein the cutter is mounted therein relative to a platform for receiving bundles or sheaves to be subjected to the cutter for the removal of the stubble, butt or bottom ends, thereby enabling the convenient handling of the bundle and the cutting of the same with despatch.

A further object of the invention is the provision of a machine of this character, wherein the construction thereof enables the same to be mounted upon a truck, wagon, sled or upon the ground so that the bundled grain, rice or the like in sheaves can be readily and conveniently placed in position relative to the cutter for the severing of the stubble, butt or bottom ends and the latter discharged from the machine, the latter being of novel form to assure the positive and successful cutting operation.

A still further object of the invention is the provision of a machine of this character, which is extremely simple in construction, thoroughly reliable and efficient in operation, durable, and inexpensive to manufacture.

With these and other objects in view, the invention consists in the features of construction, combination and arrangement of parts, as will be hereinafter fully described, illustrated in the accompanying drawings and pointed out in the claims hereunto appended.

In the accompanying drawings.

Similar reference characters indicate corresponding parts throughout the several views in the drawings.

Figure 1:
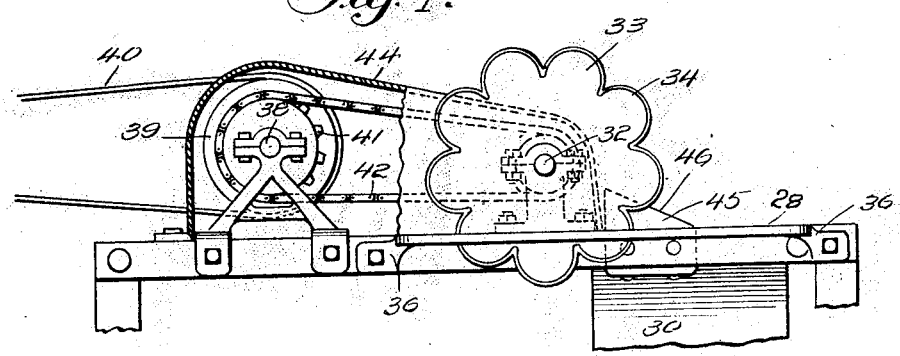
Figure 1 is a fragmentary elevation showing one form of the cutting machine, a portion of the housing for the driving connections being broken away.
Figure 2:
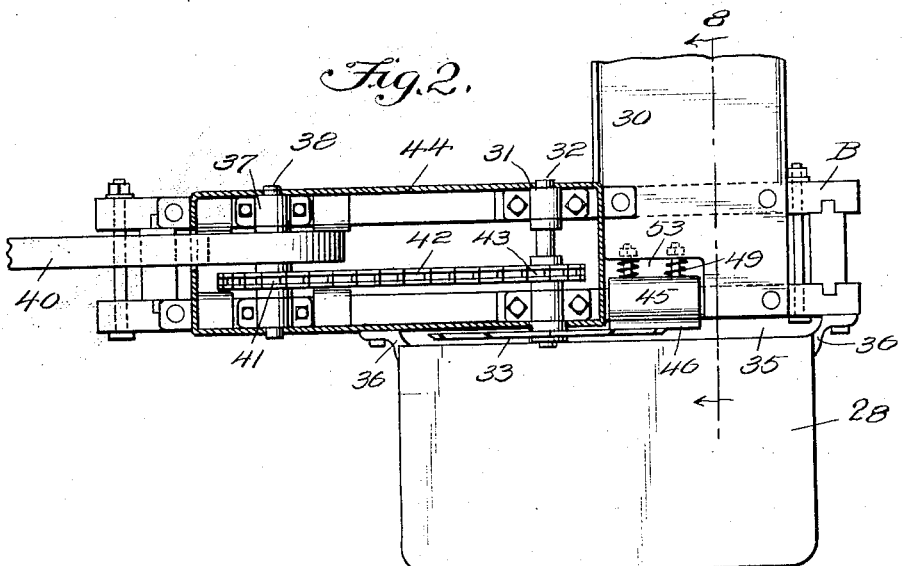
Fig. 2 is a top plan view thereof with the housing shown in horizontal section.
Figure 3:
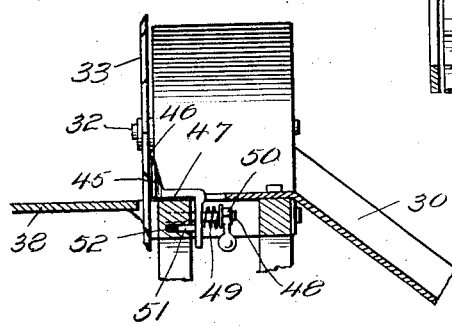
Fig. 3 is a fragmentary sectional view on the line 8—8 of Fig. 2.
Figure 4:
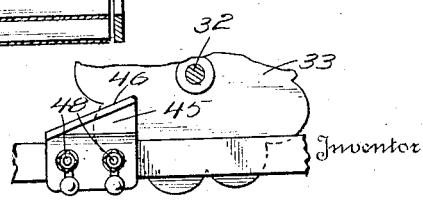
Fig. 4 is a fragmentary side elevation showing a portion of the rotary cutter and the coacting stationary cutter blade employed in the device shown.

Referring to the drawings there is shown one form of the machine, wherein the frame B has on one side thereof a platform 28 on which is adapted to be placed the bundles or sheaves of grain, rice or the like, preferably the said bundles or sheaves being delivered thereto from a suitable conveyer mechanism 29, a portion thereof being shown in Fig. 2 of the drawings. The platform 28 extends laterally from one side of the frame B and disposed transversely of said frame in communication with the platform 28 and projecting laterally from the other side of said frame is a delivery chute 30 which is disposed at an incline and is adapted to discharge the severed stubble or butts of bundles or sheaves of rice, grain or the like when cut in the machine therefrom.

Mounted upon the sills of the frame B close to the chute 30 in bearings 31 is a cutter blade shaft 32 having fixed thereto on its end next to the platform 28 a rotary cutter blade 33, the peripheral edge of which is formed with a scalloped cutting edge 34. This blade operates through a slot 35 provided at the inner end of the platform 28 by spacing the latter from the frame B through the medium of the brackets 36 supporting said platform and suitably secured to the frame.

Carried upon the frame B spaced from the bearings 31 are bearings 37 in which is journaled a shaft 38 having thereon between said bearings 37 a belt wheel 39 over which the power belt 40 is trained, the shaft 38 being also fitted with a sprocket gear 41 having trained thereover a chain 42 the same being also trained over a second sprocket gear 43 fixed upon the cutter shaft 32 between the bearings 31 and through the medium of the chain and gears motion is imparted from the power belt 40 to the rotary cutter 33 as will be clearly apparent.

Supported upon the frame B and inclosing the bearings 31 and 37, shafts 32 and 38, sprocket gears 41 and 43 and chain 42 is a housing 44 which constitutes an inclosure for these parts, and also protects the user of the machine from injury by contact with the said parts.

Working against one face of the cutter blade 33 or in close proximity thereto is a ledger blade 45 formed with the diagonal cutting edge 46 to coöperate with the fluted cutting edges 34 of said blade 33, the blade 45 being formed with a flange or bent portion constituting a carriage 47 which is slidably fitted upon guide bolts 48 mounted in the sill adjacent thereto so as to be vertically adjustable and bearing against this carriage 47 are coiled tension springs 49 which are coiled about the bolts 48, the latter being fitted with adjustable nuts 50 which work against the springs 49 and by adjustment of these nuts 50 the tension of the springs 49 can be varied to correspondingly vary the pressure of the blade 45 against the rotary cutter 33, the carriage 47 being formed with a pin 51 slidably engaging in a socket 52 formed in the sill next to the carriage 47, so that the blade 45 will be maintained steady upon the guide bolts 48 and be prevented from rocking movement.

The carriage 47 bridges the sill adjacent thereto of the frame B and the blade 45 coöperates with the rotary cutter 33 so that the material will be positively cut by the fluted cutting edges 34 during the rotation of the cutter 33, it being clearly apparent that a shear cut will be had upon the material for severing the stubble, butt or bottom ends which will drop into the chute 30 and be discharged from the machine at one side thereof.

The chute 30 is cut away at 53 to accommodate the carriage 47 of the blade 45 and to permit the adjustment thereof as has been heretofore pointed out.

The bundles or sheaves of grain, rice or the like when upon the platform 28 are placed so that the stubble, butt or bottom ends thereof will be positioned relative to the rotary cutter 33 so as to be acted upon thereby for the severing of said ends, and the severed ends will drop into the chute 30 and will be discharged from the machine.

From the foregoing it is thought that the construction of the machine will be clearly understood and therefore a more extended explanation has been omitted.

What is claimed is:

1. In a machine of the class described in combination with an open frame, power operating means and a rotatable shaft carried by said frame, a rotatable cutter carried by said shaft, a raised platform and an inclined discharge chute connected to said frame, said cutter operating between the platform and the inclined chute, said chute having a cut out corner portion for receiving an adjustable ledger blade, and means for adjusting said blade in a plurality of positions with respect to said cutter.

2. In a machine of the class described in combination with an open frame, power operating means and a rotatable shaft carried by said frame, a rotatable cutter carried by said shaft, a raised platform and an inclined discharge chute connected to said frame, said cutter operating between the platform and the inclined chute, said chute having a cut out portion in its upper corner and in proximity to the cutter, a ledger blade having a diagonal cutting edge adjustably mounted in said cut out portion, spring controlled means for laterally adjusting the said blade with respect to the cutter and locking nuts for preventing rocking movement of said blade in its various adjusted positions.

In testimony whereof, I affix my signature hereto.

HENRY SIEBERT.